United States Patent

Deane et al.

[11] Patent Number: 5,443,316
[45] Date of Patent: Aug. 22, 1995

[54] LIVE SPINDLE HUB WITH INBOARD BEARING RETENTION

[75] Inventors: Alastair R. Deane, Novi; Stanley J. Kulczycki, Sterling Heights; Vincent Mastrangelo, Ann Arbor, all of Mich.

[73] Assignee: The Budd Company, Troy, Mich.

[21] Appl. No.: 236,325

[22] Filed: Apr. 29, 1994

Related U.S. Application Data

[63] Continuation-in-part of Ser. No. 81,640, Jun. 24, 1993, Pat. No. 5,366,300.

[51] Int. Cl.⁶ ............................................. F16C 19/38
[52] U.S. Cl. ................................... 384/485; 384/537; 384/589; 384/906
[58] Field of Search ............... 384/485, 537, 906, 540, 384/571, 589

[56] References Cited

U.S. PATENT DOCUMENTS

| | | |
|---|---|---|
| 1,795,992 | 3/1931 | Blume . |
| 1,796,610 | 3/1931 | Modler . |
| 1,812,784 | 6/1931 | Hawley . |
| 2,086,500 | 7/1937 | Herrington . |
| 2,271,849 | 2/1942 | Wallace . |
| 2,609,243 | 9/1952 | Ponnequin . |
| 2,950,944 | 8/1960 | Cooney . |
| 3,112,965 | 12/1963 | Popiel . |
| 3,915,523 | 10/1975 | Shank . |
| 4,210,372 | 7/1980 | McGee ..................... 384/584 |
| 4,331,210 | 5/1982 | Petrak . |
| 4,371,214 | 2/1983 | Strader . |
| 4,881,842 | 11/1989 | Farrell et al. . |
| 4,957,328 | 9/1990 | Tsutsui . |
| 5,147,144 | 9/1992 | Kasai . |
| 5,333,380 | 8/1994 | Patz et al. ..................... 384/584 |

Primary Examiner—Lenard A. Footland
Attorney, Agent, or Firm—Harness, Dickey & Pierce

[57] ABSTRACT

An inboard bearing retainer for use in a vehicle wheel assembly having a live spindle. The inboard bearing retainer includes a retaining nut adapted to be engaged to an outer diameter of the inboard end of the live spindle. The nut including a flange which provides inboard retention and restrains inboard movement of the wheel bearing relative to the live spindle. The nut also includes a surface which at least partially defines the bearing seat for the wheel bearing. The retaining nut is engaged by a locking assembly mounted to the spindle's inboard end so as to prevent disengagement of the retainer nut from the spindle. In one embodiment, the locking assembly is a one-piece body having a bearing portion, a thrust washer portion and locking tabs which interferingly prevent disengagement of the retainer nut from the live spindle.

24 Claims, 9 Drawing Sheets

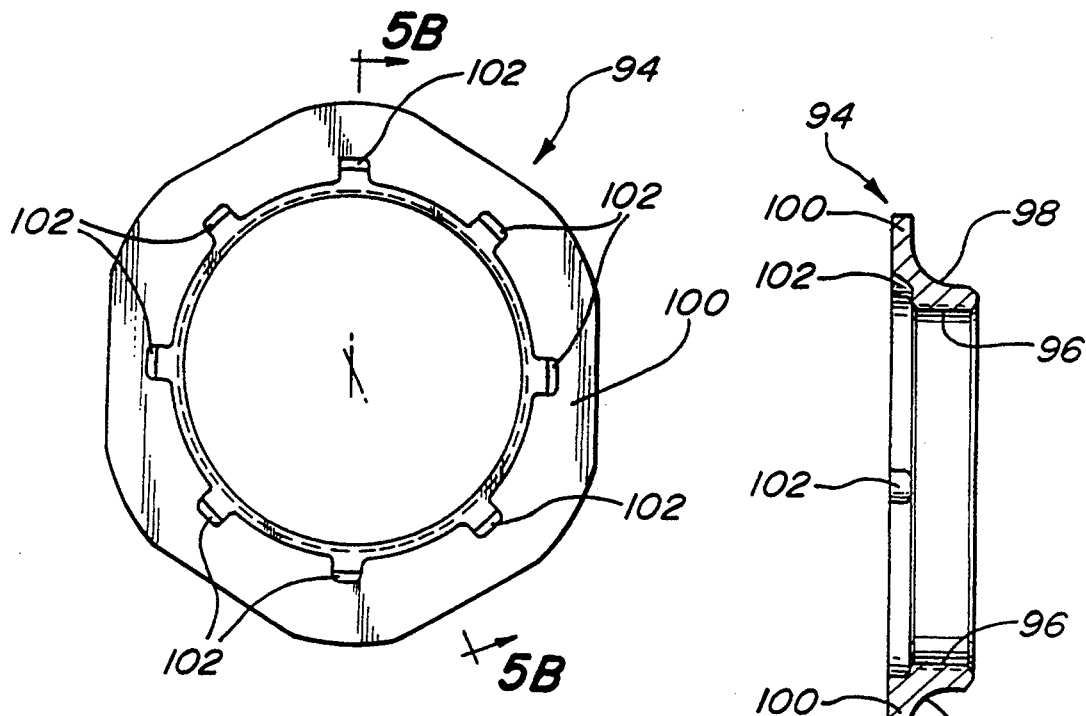
Fig-5A
Fig-5B
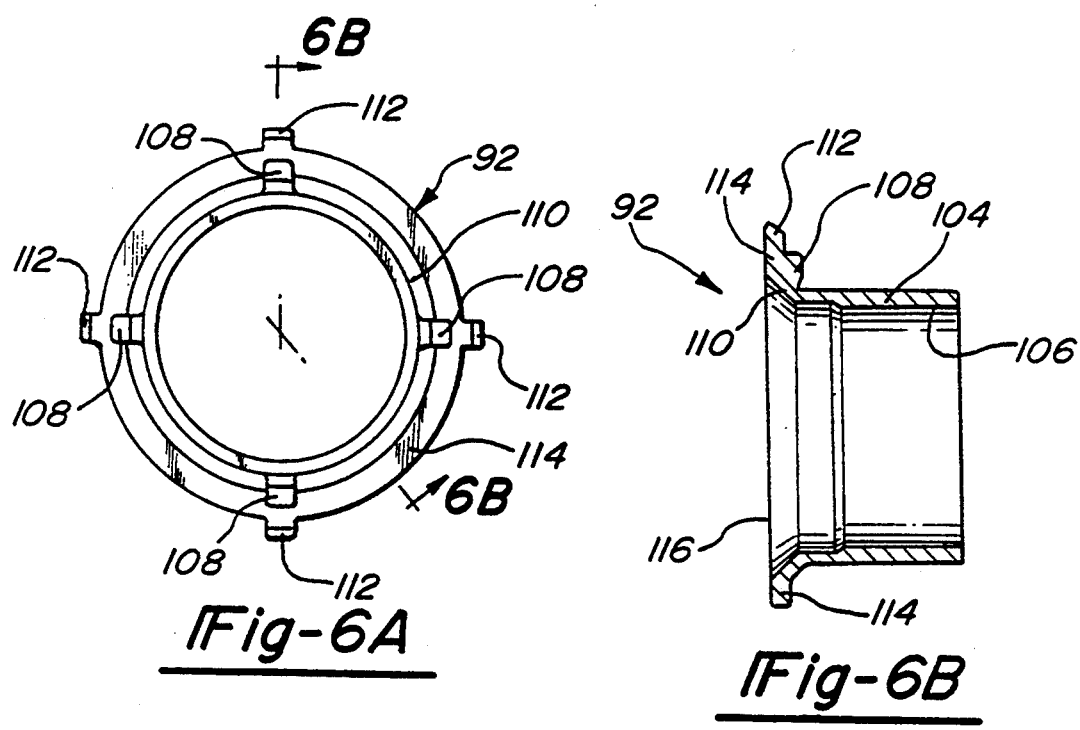
Fig-6A
Fig-6B

LIVE SPINDLE HUB WITH INBOARD BEARING RETENTION

CROSS REFERENCE TO RELATED APPLICATION

This application is a continuation-in-part of U.S. patent application Ser. No. 08/081,640 filed on Jun. 24, 1993, now U.S. Pat. No. 5,366,300.

BACKGROUND AND SUMMARY OF THE INVENTION

This invention generally relates to motor vehicle wheel assemblies and, more particularly, to the inboard retention of a wheel bearing used for rotatably mounting a live spindle in the wheel assembly.

Vehicle wheel assemblies utilizing live spindles are found in motor vehicles capable of functioning in an four-wheel drive operational mode. The live spindle or hub is journaled or mounted for rotation within a mounting component of the wheel assembly. A wheel bearing is interposed between the mounting portion and the spindle enabling the spindle to rotate relative to the mounting portion. An axle shaft is rigidly connected to the live spindle and includes an inboard flange for retaining the bearing on the live spindle. If the vehicle is configured to operate in either a two-wheel or four-wheel drive mode, a center axle disconnect mechanism is provided to selectively couple the axle to the transmission.

Motor vehicle wheel assemblies utilizing dead spindles are also capable of operating in either two-wheel or four-wheel drive modes. A hub lock may be provided to selectively couple the wheel assembly to the axle. The axle shaft typically extends through a central bore in the dead spindle and is journaled therein by a set of needle bearings or another type of bearing. Generally, the dead spindle is threaded on its outboard end and has an inboard flange which operates as the inboard retainer for the wheel bearing on the spindle. A nut is threaded onto the threaded end of the dead spindle and is torqued or tightened down to provide for the recommended setting range specified by the bearing manufacturer. This cooperation maintains the hub on the dead spindle while enabling relative rotation between these two components.

Today, several types of hub locks are in common use on dead spindles. They include manually actuated hub locks and self-locking hub locks. In either variety, the hub is allowed to free wheel relative to the axle in the two-wheel drive mode and is rigidly connected to the axle for rotation therewith in the four-wheel drive mode. Manual hub locks are most often mounted to couple the outboard end of the hub to the outboard end of the axle. During operation, if locked, the drive axle and the hub, as well as the wheel mounted to the hub, will rotate together. When unlocked, the hub is free to rotate independently of the axle thereby allowing the transfer case to disengage the axle from the transmission and providing the vehicle with better fuel mileage.

Prior art designs are limited in that the outboard mounting of the hub lock protrudes a substantial distance from the hub flange if an outboard retainer is used. Inboard retention of the hub and the bearing has significant size constraints because of the packaging of the suspension king pin axis, the axle joints and, if provided on the vehicle, the anti-lock brake system components.

With the above limitations in mind, it is an object of the present invention to provide a live spindle with hub lock and inboard bearing retention while separating the bearing retention function from the axle or half shaft. In doing so, the present invention seeks to permit a limited amount of axial movement in the axle without affecting the pre-load of the wheel bearing. Axial movement of the axle may be a necessary result of the specific suspension of the vehicle as well as the steering component of the wheel assembly.

Another object of this invention is to provide inboard bearing retention while minimizing the size of the packaging for the bearing retainer. Still another object of this invention is to provide a locking feature which will assure that the bearing retainer does not inadvertently become disengaged from the live spindle during operation of the vehicle and yet simplify the construction necessary for inboard bearing retention.

In overcoming the limitations of the prior art and achieving the objects mentioned above, the present invention provides a live spindle mounted for rotation in a mounting portion of the wheel assembly. The live spindle includes a central bore through which extends an axle that can be driven in rotation by the vehicle's transmission. A hub lock is used to couple the outboard end of the live spindle to the outboard end of the axle so that rotation of the axle will drive the live spindle and the attached wheel thereby operating the vehicle in its four-wheel drive mode. The live spindle is rotatably supported within the knuckle or mounting portion of the vehicle wheel assembly by a wheel bearing whose inner race is seated on the live spindle.

Inboard bearing retention is provided by forming threads on the outer diameter of the live spindle's inboard end. The diameter at which the threads are formed is less than that of the press-fit surface defining the bearing seat on the spindle. A primary feature of the present invention is an inboard bearing retainer or nut which engages with the threads on the live spindle and includes surfaces which define the inboard portion of the bearing seat. This provides the present invention with a small or reduced package dimensions. A radial flange on the bearing retainer engages the inboard end and inner diameter of the bearing inner race and prevents inboard axial movement of the wheel bearing. By progressively threading the bearing retainer onto the live spindle, the proper torque for pre-loading the bearing can be set.

Another primary feature of the present invention is a one-piece retainer lock which is press-fit into the inboard end of the live spindle. The particular features of the retainer lock allowing it to perform a variety of functions including, but not limited to: 1) prevent disengagement of the bearing retainer from the live spindle; 2) operate as a bearing for the axle within the live spindle; and 3) receive axial thrust loads without transferring them to the wheel bearing.

To prevent disengagement of the bearing retainer, a number of equidistantly spaced and radially directed slots are formed on the inboard end of the live spindle. Radial slots are also formed on the inboard side of the bearing retainer so that, once the minimum bearing pre-load has been established by the bearing retainer, the retainer can be readily adjusted to align at least one of its slots with at least one of the slots in the inboard end of the live spindle. The retainer lock is press-fit into engagement with the inboard end of the spindle and bearing retainer so that a locking member, which may be formed on the retainer lock and bearing, is located within and extending between the aligned slots of the live spindle and bearing retainer. The locking member prevents the bearing retainer from rotating relative to the live spindle and inadvertently becoming disengaged therefrom.

In one of the preferred embodiments, the retainer lock includes, in addition to the locking member, a portion which defines a sleeve or shaft bearing. The sleeve bearing extends along an inner surface of the live spindle and supports the axle therein. The inboard end of the retainer lock includes a radial portion defining a thrust face which extends axially inboard of the bearing retainer. The thrust face is a rubbing surface which receives axial loads resulting from end play in the axle and the various other components of the wheel assembly. This prevents the loads from being transferred directly to the wheel bearing. In an alternative embodiment, the sleeve bearing is replaced by a separate and distinct needle bearing of the common variety.

The locking member itself is either formed unitarily with the retainer lock or is provided as a separate roll pin. The roll pin is first positioned within the aligned slots of the spindle and the bearing retainer and secured by the retainer lock being press-fit thereover so as to define the thrust washer.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 5A is an end view of a bearing retainer utilized in the preferred embodiment of this invention;

FIG. 5B is a sectional view of the bearing retainer taken substantially along lines 5—5 in FIG. 5A;

FIG. 6A is an end view of a retainer lock used in the preferred embodiment of this invention;

FIG. 6B is a sectional view of the retainer lock taken substantially along line 6—6 in FIG. 6A;

DETAILED DESCRIPTION OF THE PREFERRED EMBODIMENTS

Figure 1:
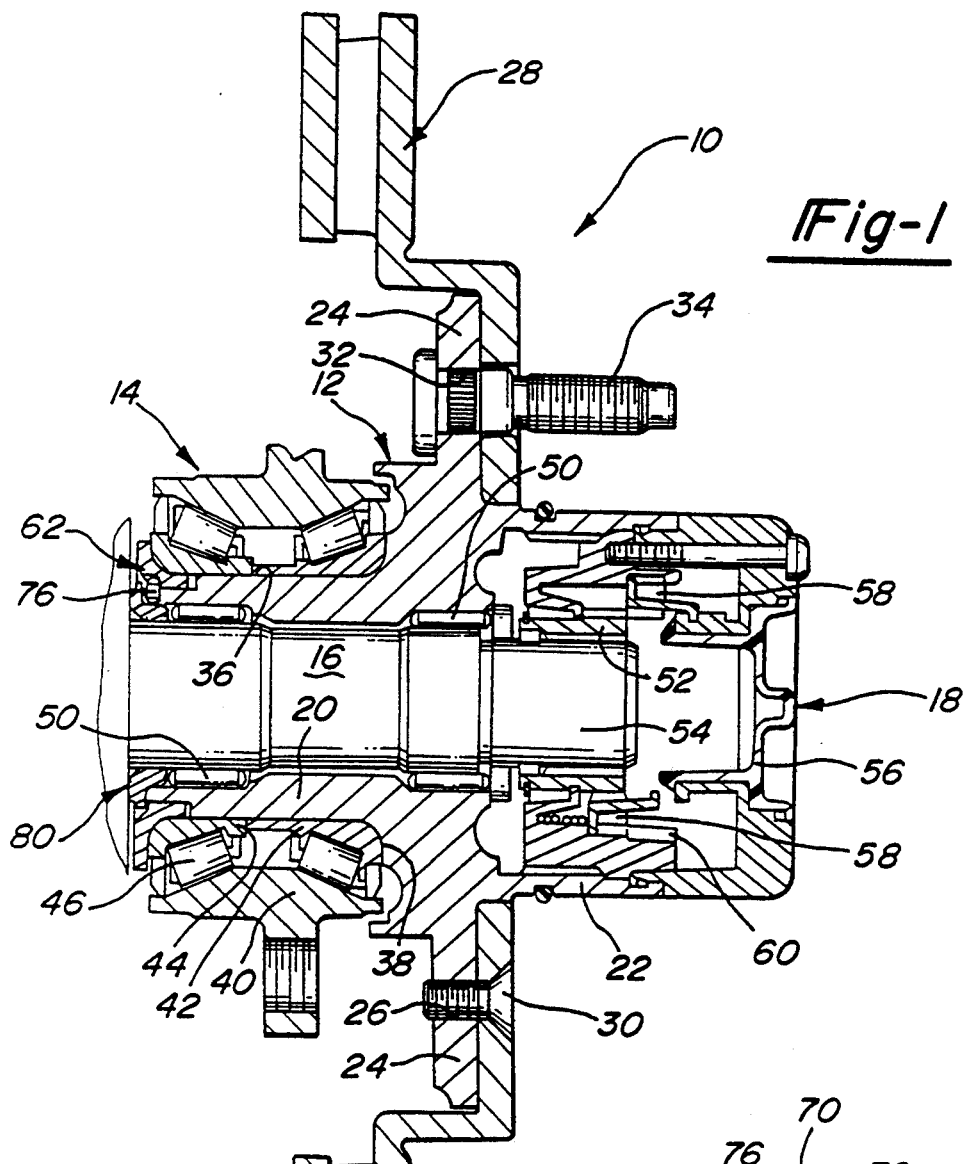
FIG. 1 is a sectional view of a portion of a vehicle wheel assembly having a live spindle and incorporating the principles of the present invention.

Referring now to the drawing, a portion of a vehicle wheel assembly is generally illustrated in FIG. 1 and designated at 10. The assembly 10 illustrates common features of vehicle wheel assemblies, as well as one of the preferred embodiments of the present invention, as might be used with the front wheels of a four wheel drive vehicle. Additional preferred embodiments, are discussed below in connection with FIGS. 4–8. The wheel assembly 10 includes a live spindle 12 which is journaled or mounted by a wheel bearing 14 in a steering knuckle or mounting portion (not shown) thereof. A stub axle 16 extends through the central portion of the spindle 12 and is journaled or mounted to enable rotation therein. The outboard end of the stub axle 16 and the outboard end of the spindle 12 can be coupled together for synchronous rotation by a hub lock 18. When the hub lock 18 is locked, rotation of the stub axle 16 drives or rotates the spindle 12 causing the vehicle wheel (not shown) to rotate under the influence of the transmission and allowing the vehicle to operate in a four-wheel drive mode.

The spindle 12 is generally a cylindrical body having an inboard portion 20 and an outboard portion 22 from between which a wheel mounting flange 24 extends radially outward. The flange 24 includes apertures 26 which allow a brake disc rotor 28 to be mounted to the flange 24 by fasteners 30 such as bolts. The flange 24 also includes a number of equidistantly spaced apertures 32. These apertures 32 receive wheel mounting lugs 34 that mount the wheel (not shown) to the assembly 10.

The inboard portion 22 of the live spindle 12 includes an exterior surface that defines a bearing seat 36 onto which the wheel bearing 14 is press-fit. An outboard shoulder 38 on the bearing seat 36 prevents axial outboard movement of the wheel bearing 14.

The wheel bearing 14 is one of a known variety within the industry and includes a non-moving or fixed outer race 40, a rotatable inner race, and rollers 46. The inner race itself has an outboard race 42 and an inboard race 44. As is apparent from the above discussion, when properly press-fit onto the spindle 12, the outboard race 42 engages the outboard shoulder 38 of the bearing seat 36 and locates the wheel bearing 14 on the spindle 12.

Figure 2:
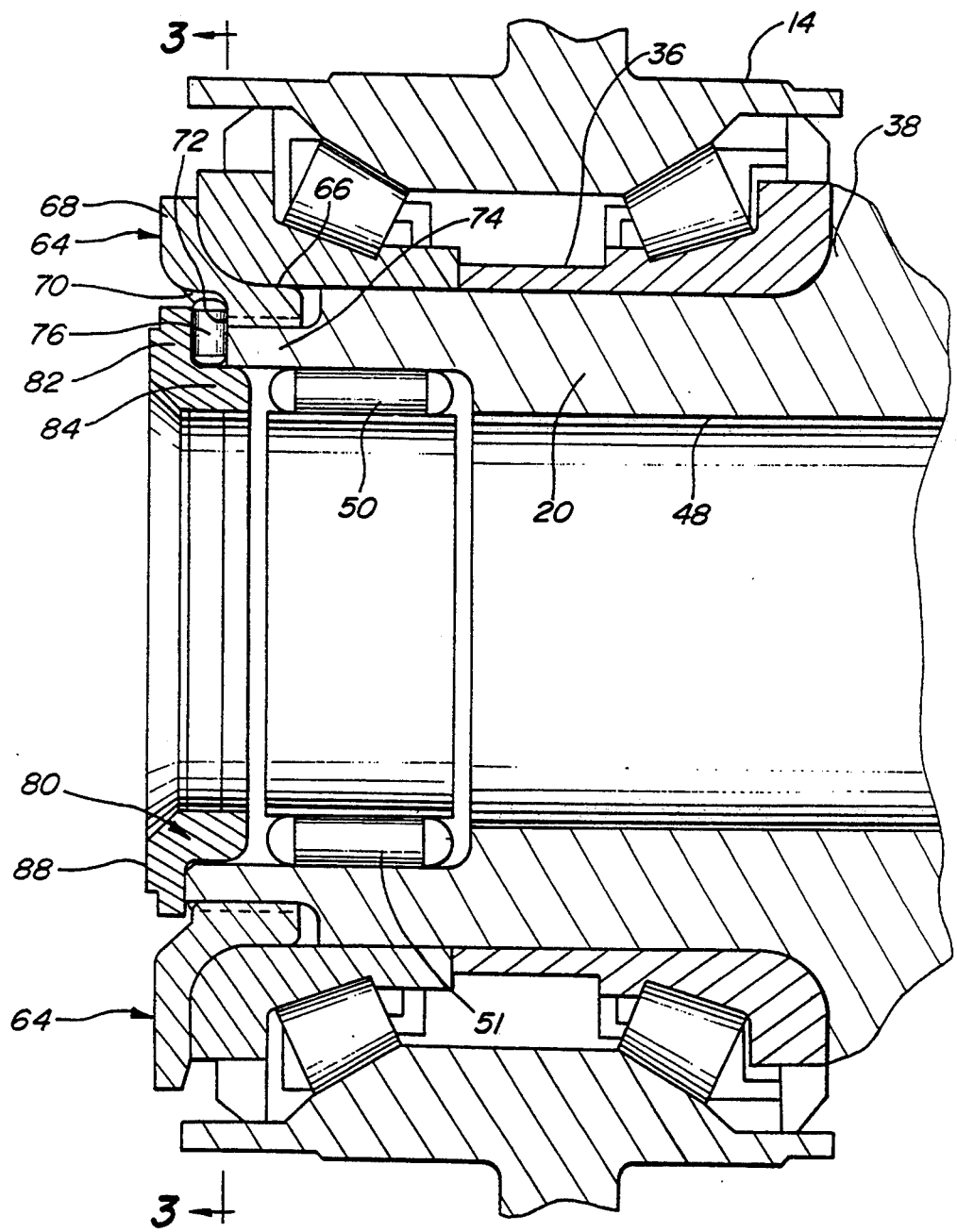
FIG. 2 is an enlarged sectional view of a portion of the live spindle shown in FIG. 1 illustrating in greater detail the inboard bearing retention features of the present invention.

As seen in FIG. 2, a central bore 48 is defined through the body of the spindle 12 and the stub axle 16 extends this bore 48. In one embodiment of the present invention, seen in FIGS. 1 and 2, the stub axle 16 is journaled for rotation within the central bore 48 by needle or shaft bearings 50 disposed between the stub axle 16 and the central bore 48 of the spindle 12 on a bearing seat 51.

Splines 52 are unitarily formed, or provided by attachment of a toothed ring, on the outboard end 54 of the stub axle 16. The splines 52 are capable of being engaged by the coupling mechanism of the hub lock 18 to rigidly connect the stub axle 16 to the spindle 12. In this illustrated embodiment, the hub lock 18, which has a conventional construction, generally includes a manual actuator 56 which can be rotated to cause a toothed ring 58 to move into and out of engagement with the splines 52 and a radially inwardly splined member 60, rigidly mounted to the outboard portion 22 of the spindle 12. As seen in FIG. 1, the toothed ring 58 of the hub lock 18 is always engaged with the splines member 60 and can axially slide on the splined member 60 to a location where the toothed ring 58 also engages the splines 52 on the outboard end 54 of the stub axle 16.

The toothed ring 58 is shown in FIG. 1 as being both engaged with and disengaged from the splined member 60. In the upper half of FIG. 1, the toothed ring 58 is shown disengaged from the splined member 60 and, in the lower half of the Figure, the toothed ring 58 is shown engaged with the splined member 60. While the illustrated embodiments show the present invention utilizing a manual hub lock 18, the hub lock 18 could alternatively be automatic or self-locking. The remaining features of the hub lock 18, the additional structures of the stub axle 16 and the additional associated structures of the live spindle 12 are conventionally constructed in a manner generally well known in the industry and are therefore not further described in detail.

Figure 3:
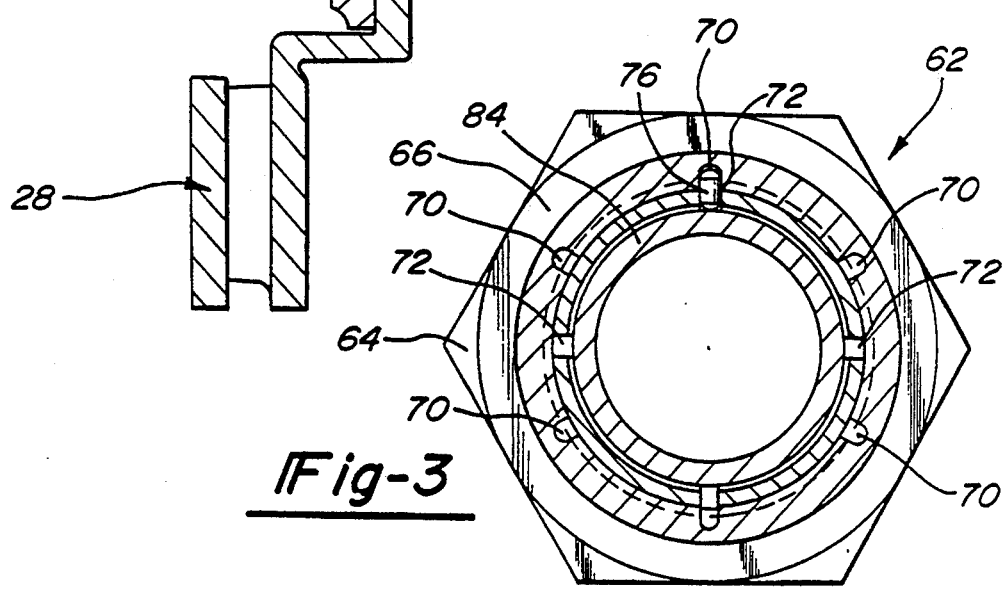
FIG. 3 is a sectional view taken substantially along line 3—3 in FIG. 2 showing the mechanism for preventing relative rotation between the bearing retainer and the live spindle.

Referring now to FIGS. 1, 2 and 3, one embodiment of an inboard bearing retainer assembly according to the principles of the present invention is illustrated therein and generally designated at 62. The retainer assembly 62 includes a bearing retainer or nut 64 which is threadably engaged on the threaded outer diameter of the spindle's inboard portion 20. The nut 64 includes a surface, generally on its outer and outboard side, which defines an inboard portion 66 of the bearing seat 36. An inboard shoulder 68 is also formed on the nut 64 to capture the wheel bearing 14 and prevent its inboard movement. Because the wheel bearing 14 must be sufficiently pre-loaded to ensure proper operation and retention of the spindle 12, the threaded engagement of this invention allows the pre-load to be adjusted through proper torquing of the nut 64.

Mounting the nut 64 on the outer diameter of the live spindle 12 and utilizing it to form a portion 66 of the bearing seat 36 provides the assembly of the present invention with a small or tight packaging. The small packaging is extremely valuable since it allows for maximum sizing of the stressed parts such as the wheel bearing 14, spindle 12 and axle 16.

Once engaged on the spindle 12, steps must be taken to prevent inadvertent disengagement of the nut 64 during operation of the vehicle. The means for locking the nut 64 to the spindle 12 includes a plurality of slots 70 formed on the inboard side of the nut 64 generally adjacent to its inner diameter. The slots 70 are equidistantly positioned around the nut 64 so that once properly torqued, at least one slot 70 will correspond with one of a plurality of radial slots 72 defined in an inboard end 74 of the spindle 12. A shear or roll pin 76 is positioned within the aligned slots 70 and 72, extending between the slots 70 and 72, and prevents rotation of the nut 64 relative to the spindle 12 and disengagement therefrom.

The shear pin 76 is held within the slots 70 and 72 by a thrust washer 80 which is press-fit into the spindle 12. If desired, a conventional seal ring (not shown) may also be provided in the assembly 62 to maintain lubrication of the needle bearings 50. The thrust washer 80 includes a radial portion or flange 82 which extends over the shear pin 76 and slots 70 and 72 as well as the inboard end 74 of the spindle 12. An axial portion 84 of the thrust washer 80 engages the inboard end 74 of the spindle 12 and prevents the shear pin 76 from radially inwardly disengaging from the slots 70 and 72.

A radially defined surface on the thrust washer 80 forms a thrust face 88 that operates as a rubbing surface. The thrust face of the washer 80 receives axial loads resulting from end play of the stub axle 16 and the other wheel assembly components and prevents these axial loads from being transferred directly to the nut 74 and the wheel bearing 14.

Figure 4:
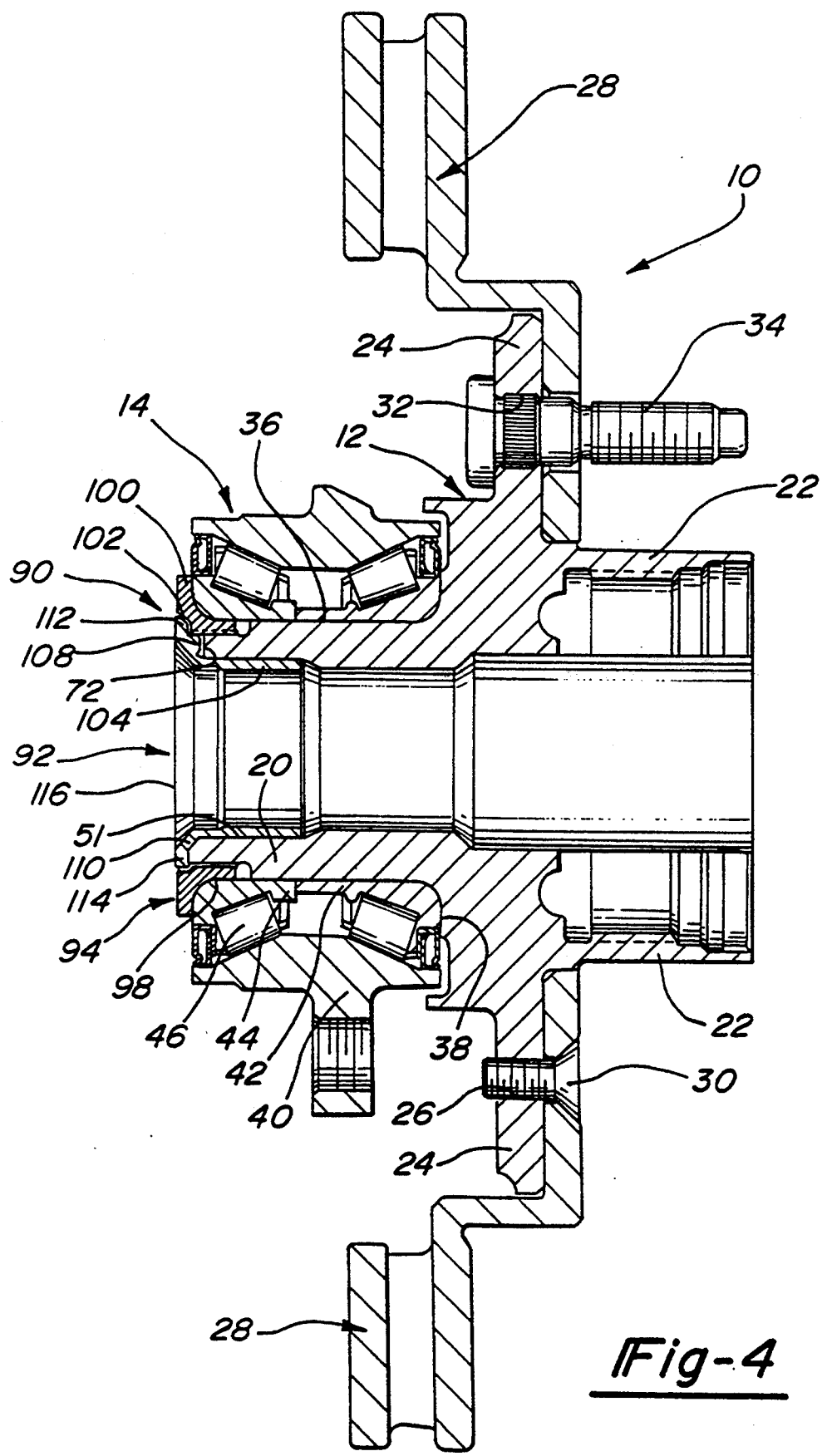
FIG. 4 is a sectional view similar to FIG. 3 and illustrates the preferred embodiment of the present invention.

A second preferred embodiment of the present invention is generally illustrated in FIGS. 4 through 6B and designated as assembly 90. As seen in FIG. 4, the inboard bearing retainer assembly 90 is utilized with a wheel assembly that is substantially the same as that shown in FIG. 1. For this reason, elements common between the Figures are designated with like references. For the sake of clarity, the locking hub 18 has been omitted.

In this second of the preferred embodiments, an inboard bearing retainer assembly 90 is provided with an integrally formed or one-piece retainer lock 92. The retainer lock 92 includes portions which physically replace the separate shear pin 76, thrust washer 80 and the inboard set of needle bearings 50 in the above mentioned embodiment while integrating their functions.

As with the previous embodiment, a nut 94 is threadably engaged on a threaded outer diameter of the spindle's inboard portion 20. The nut 94, which is best seen in FIGS. 5A and 5B, includes a threaded portion on its inner diameter for engaging the spindle 92, an outer and outboard surface 98 which defines a portion of the bearing seat 36, and an inboard shoulder 100 that prevents inboard axial movement of the wheel bearing 14. The shoulder 100 has a general hexagonal shape which allows engagement by a wrench or other means for tightening the nut 94 on the spindle 12. On the inboard side of the threaded portion 96, the nut 94 includes recessed portions which define equidistantly spaced slots 102. Eight slots 102 are shown in the illustrated embodiment.

Once the nut 94 has been sufficiently torqued to pre-load the wheel bearing 14, the nut 94 is then minimally rotated to move the slots 102 and 72 into predetermined positions relative to one another or, preferably, to generally align at least one of the slots 102 in the nut 94 is aligned with a slot 72 defined in the inboard end 74 of the spindle 12. While only one slot 102 of the nut 94 and one slot 72 of the spindle 12 need to be aligned to positively retain the nut 94 on the spindle 12 with the present invention, it is preferred that a greater number of the slots 102 and 72 become aligned. In the present embodiment, the slots 102 and 72 are provided so that four of the slots 102 will align with four slots 72 at a given time. As seen in FIG. 4, when aligned, the slots 102 of the nut 94 are located radially outward and axially inboard from the slots 72 of the spindle 12.

With the slots 102 and 72 aligned, the retainer lock and bearing 92 can be engaged with the nut 94 and spindle 12. As best seen in FIGS. 4, 6A and 6B, the retainer lock 92 is press-fit into engagement with the spindle 12 and nut 94 so that an integral cylindrical extension or sleeve bearing 104 will be seated on the inner bore of the live spindle 12. The sleeve bearing 104 defines a central bore or bearing surface 106 which will contact the stub axle 16 and support it for rotation within the spindle 12.

To enable functioning as a bearing, the retainer lock 92 can be constructed from a variety of bearing surface materials, including an oil impregnated material such as bronze. This in turn allows the sleeve bearing 104 to be self-lubricating over its lifetime eliminating the need for additional service. The substitution of the solid sleeve bearing 104 for the needle bearings 50 provides for increased rigidity by allowing the section thickness of the spindle's inboard portion 20 to be increased. This is a result of the reduced thickness needed for the sleeve bearing 104 relative to the thickness needed for needle bearings 50.

Axially inboard of the sleeve bearing 104, the retainer lock 92 is provided with equidistantly spaced locking tabs 108. The tabs 108 extend radially outward from a web 110 on the inboard end of the sleeve bearing 104 and are spaced so that they fit into the slots of the spindle 12. Located radially outward and axially inboard of the locking tabs 108 are four additional locking tabs 112. These tabs 112 fit into the slots 102 of the nut 94 when it is properly oriented with the spindle 12.

When the retainer lock 92 is engaged with the spindle 12 and nut 94, the tabs 108 and 112 respectively cooperate with the slots 72 and 102 to interferingly prevent relative rotation between and disengagement of the nut 94 from the spindle 12. The provision of separate locking tabs 108 and 112 increases the shear force which can be withstood before the tabs 102 and 72 shear and the nut 94 disengages from the spindle 12. By reducing or increasing the number of tabs 108 and 112, the allowable shear can be changed as dictated by the specific design considerations of the wheel assembly.

To additionally support the locking tabs 108 and 112, the retainer lock 92 is provided with an integral radial flange 114 or thrust washer. The thrust washer 114 defines a thrust surface 116, located axially inboard of the nut 94, which will receive outboard axial loads and permit a degree of end play in the axle 16 without transmitting the loads directly to wheel bearing 14.

As can be seen from the above discussion, the integral retainer lock 94 used in the preferred embodiment has a number of advantages. One advantage is that the total number of parts needed in the assembly 90 is reduced. Another advantage is that once the inboard bearing retainer assembly 90 has been mounted to the spindle 12, it can be assured that lock pins or tabs 108 and 112 are properly in place to prevent inadvertent disengagement of the nut 94 from the spindle 12. Similarly, the integral retainer lock 94 assures that the axle 16 has a bearing surface 106 on which it will be supported. Visual inspection of the fully assembled unit thus readily assures the presence of all these features. Another advantage of this embodiment is the flexibility offered with regard to the amount of "lock pin shear" which can be provided by the tabs 108 and 112 in the assembly 90. Three more advantages which were discussed above include the allowable increase in section thickness for the inboard portion 20 of the spindle 12, no service requirements and an overall small packaging.

Figure 7:
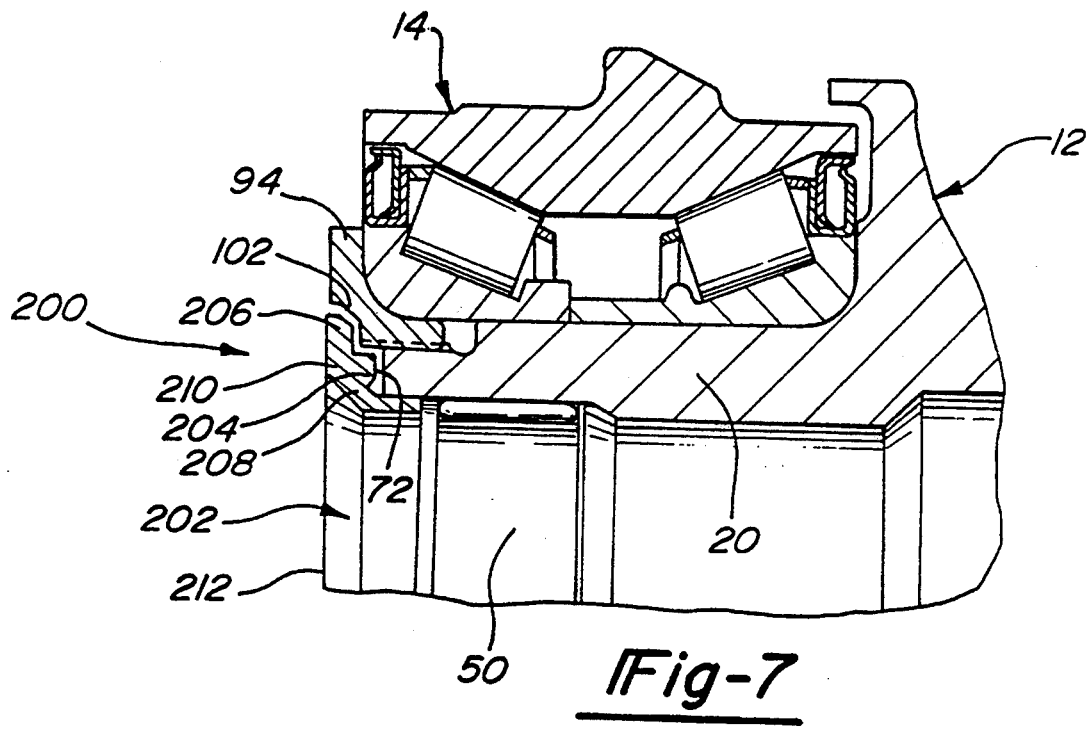
FIG. 7 is an enlarged sectional view of a portion of another embodiment of this invention.
Figure 8:
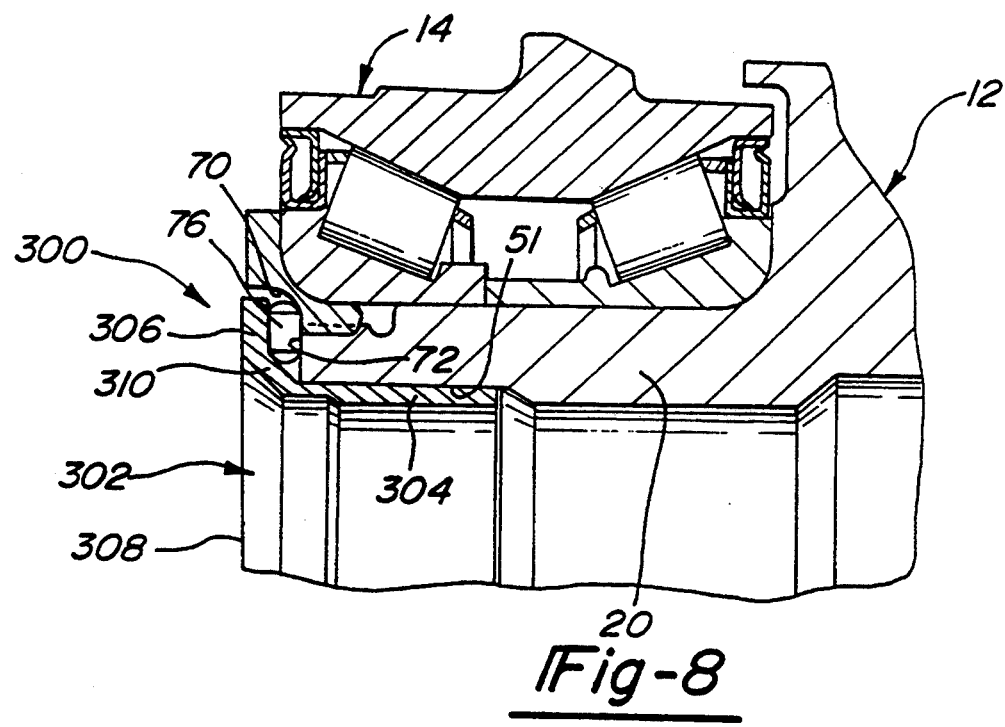
FIG. 8 is an enlarged sectional view of a portion of yet another embodiment of this invention.
Figure 9:
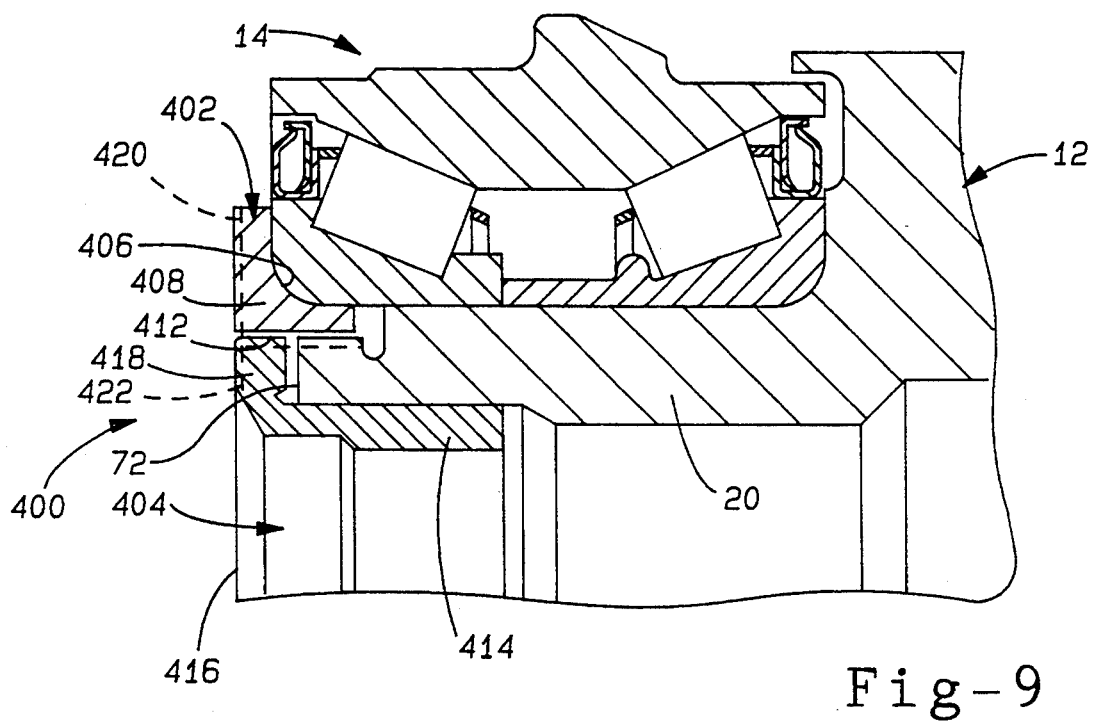
FIG. 9 is an enlarged sectional view of portion of another embodiment of this invention.

Variations on the above embodiment are presented in FIGS. 7 and 8. In the embodiment of FIG. 7, the bearing function of the retainer lock has been separated so that, instead of the one-piece retainer lock 92 of the second embodiment, an inboard bearing retainer assembly 200 is provided with a retainer lock 202 that cooperates with separate needle bearings 50. In all other respects, the retainer lock 202 is the same as the above embodiment. Thus, when press-fit into the spindle 12, locking tabs 204 will be located in the slots 72 of the spindle 12 while another set of locking tabs 206 will be located in the slots 102 of the nut 94. The tabs 204 and 206 are similarly formed on a web 208 and thrust washer 210, having a thrust face 212, of the retainer lock 202.

In the alternate embodiment of FIG. 8, an inboard bearing retainer assembly 300 incorporates features of both the first and second embodiments. As such, the assembly 300 uses a shear pin 76 located within the aligned slots 70 of the nut 64 and slots 72 of the spindle 12. A retainer lock 302 is press-fit into engagement with the spindle 12 so that an integrally formed sleeve bearing portion 304 is seated in the inner bore 48 of the spindle 12. The retainer lock 302 includes a thrust washer portion 306, defining a thrust face 308, connected by a web 310 to the sleeve bearing 304. In this manner, the thrust washer 306 of the retainer lock 302 extends over the slots 70 and 72 and shear pin 76 axially retaining the shear pin 76 in the slots 70 and 72 while the web 310 radially retains the shear pin 76 within the slots 70 and 72.

Referring now to FIGS. 9–11C, another preferred embodiment of a bearing retainer assembly 400 according to the principles of this invention is illustrated therein. As with the prior embodiments, the bearing retainer assembly 400 includes a retainer nut 402 and a retainer lock 404. The retainer lock 404 is unitarily formed and integrates the functions normally performed by the shear pin, thrust washer and needle bearings.

Figure 10:
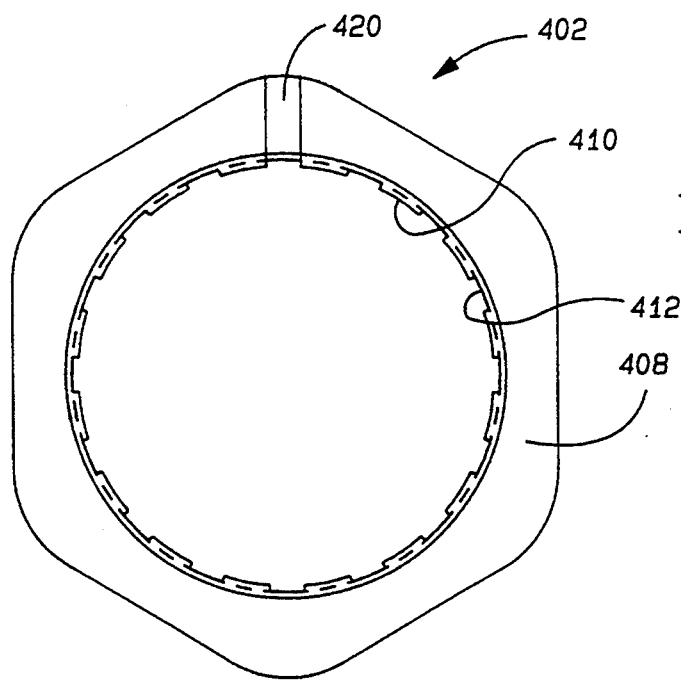
FIG. 10 is an inboard end view of the bearing retainer nut seen in FIG. 9.

The retainer nut 402 includes a threaded portion 410 on its inner diameter and is threadably engaged on the threaded outer diameter of the spindle's inboard portion 20. The nut 402 also includes an outboard surface 406 (defining a portion of the bearing seat 36) and an inboard shoulder 408 (preventing axial inboard movement of the wheel bearing 14). As seen in FIG. 10, the bore defined by the threads 410 of the retainer nut 402 is provided with a plurality of axial recesses that define equidistantly spaced slots 412. The outer diameter of the nut's shoulder 408 is generally hexagonal in shape and this allows the nut 402 to be engaged by a wrench or other tool means for tightening the nut 402 on the spindle 12.

Once the retainer nut 402 has been sufficiently tightened and the desired preload provided on the wheel bearing 14, if needed, the nut 402 is then further rotated to align the axial slots 412 of the nut 402 with the radial slots 72 on the inboard end of the spindle 12. As seen in FIG. 10, the retainer nut 402 is provided with sixteen equidistantly spaced slots 412 so that a minimal change in the bearing preload will occur during aligning of the slots 412 of the retainer nut 402 with those of the spindle 12. If desired, a greater or lesser number of slots 412 could be provided.

Once the slots 412 and 72 have been aligned, the retainer lock 404 is engaged with the inner diameter of the spindle 12 and retainer nut 402 in a press-fit engagement so that an integral cylindrical extension or sleeve bearing 414 of the retainer lock 404 is seated on an inner bore of the spindle 12. As with the prior embodiments, the sleeve bearing 414 defines a bearing surface which will contact and rotatably support the stub axle 16 relative to the spindle 12.

Axially inboard of the sleeve baring 412, the retainer lock 404 is provided with a radial flange 416, the inboardmost surface of which operates as the thrust face of a thrust washer by extending a predetermined distance beyond the inboardmost surface of the retainer nut 402. Spaced about the radial flange 416 and extending therefrom in a generally axially outboard direction are a plurality of locking tabs 418. The locking tabs 418 are equidistantly spaced about the retainer lock 404 and provided so that they will correspond to and fit within the aligned slots 412 and 72 respectively of the retainer nut 402 and spindle 12.

When the retainer lock 404 is properly engaged, the locking tabs 418 simultaneously extend within the slots 412 and 72 of both the retainer nut 402 and spindle 12. As such, the tabs 418 interferingly engage those portions defining the slots 412 and 72 preventing relative rotation between the disengagement of the retainer nut 402 from the spindle 12. In this embodiment, should one or more of the locking tabs 418 becomes sheared from the retainer lock 404, the sheared locking tab 418 will remain entrapped by the flange 416 within the aligned slots 412 and 72 and continue to perform its locking function.

Optionally, the inboardmost surface of the retainer nut 402 can be provided with a groove 420 corresponding with a groove 422 defined in the thrust face of the retainer lock 404. The grooves 420 and 422 will provide an oil passageway for lubrication of the thrust face, bearing and seal portions and also can provide a vacuum/pneumatic pathway to enable actuation of the locking hub. The groove 422 of the retainer lock 404 is located so that it corresponds with one of the locking tabs 418. This enhances powder metal production by increasing the density and fill retained in the locking tabs 418.

Figure 11A:
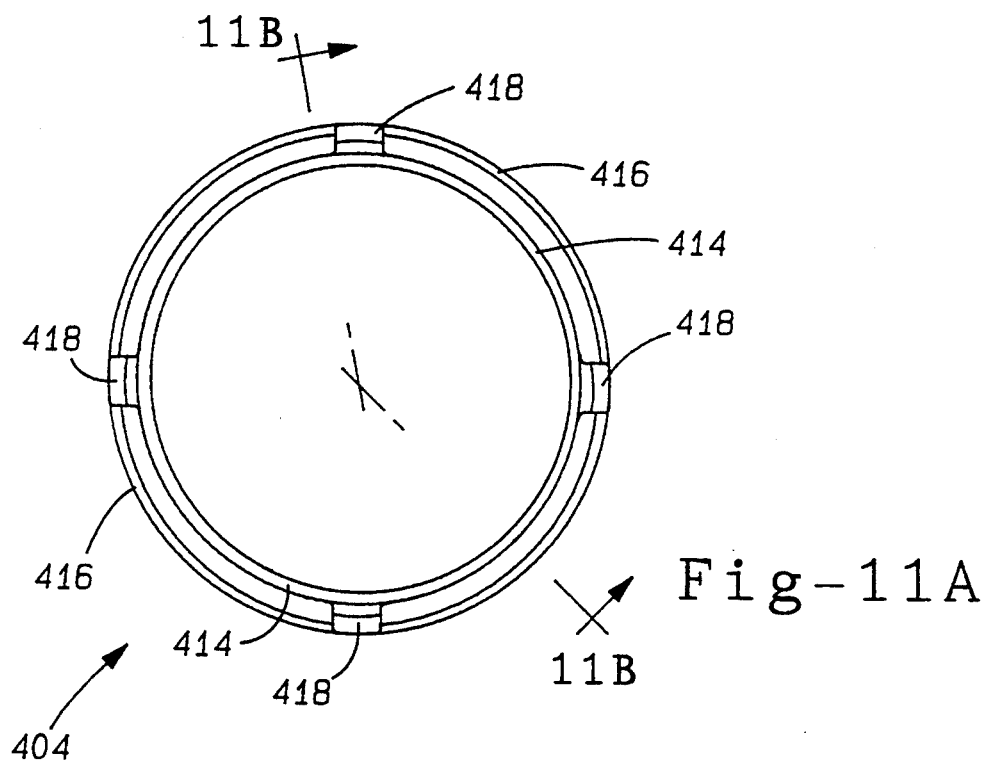
FIG. 11A is an outboard end view of the retainer lock seen in FIG. 9.
Figure 11B:
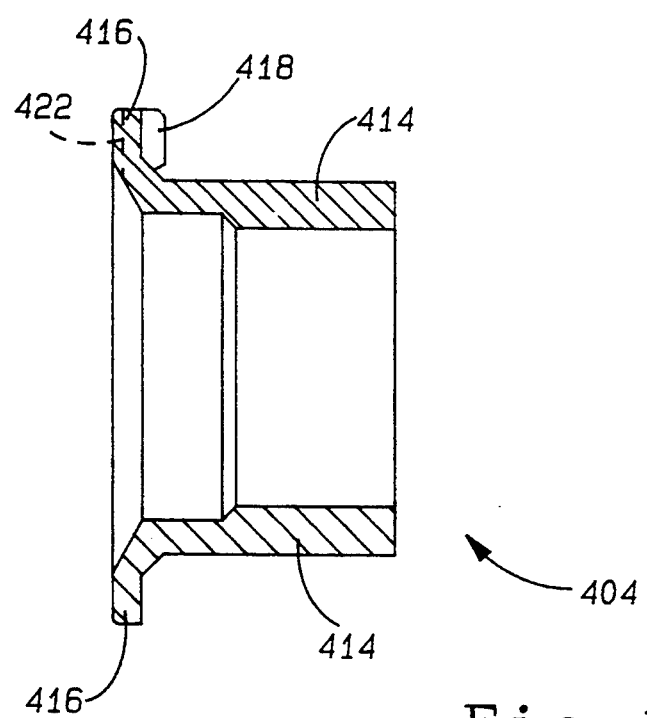
FIG. 11B is a sectional view taken substantially along line 11—11 in FIG. 11A.
Figure 11C:
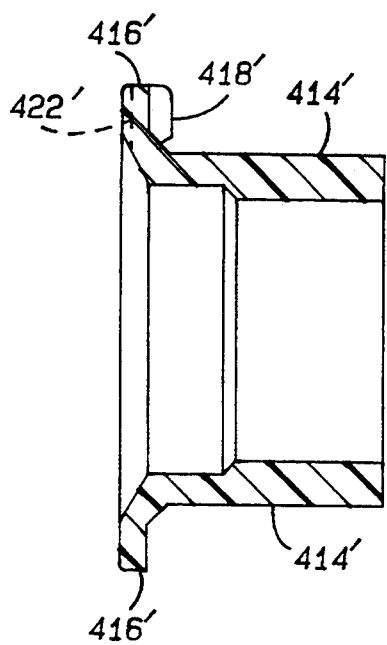
FIG. 11C is a sectional view substantially similar to that shown in FIG. 11B except being constructed from an injection molded polymer.

Alternatively, the retainer lock 404', as seen in FIG. 11C, can be constructed from a glass filled nylon or injection molded polymer. To improve the retainer lock's 404' radial and thrust loading capabilities, additives, such as molybdenum, could be used to increase the wear characteristics of the retainer lock 404' beyond that of hardened steel. The retainer lock 404' includes all of the features and elements of the above described retainer lock 404. For this reason, common elements are designated with common item numbers bearing a prime (') designation.

Figure 12A:
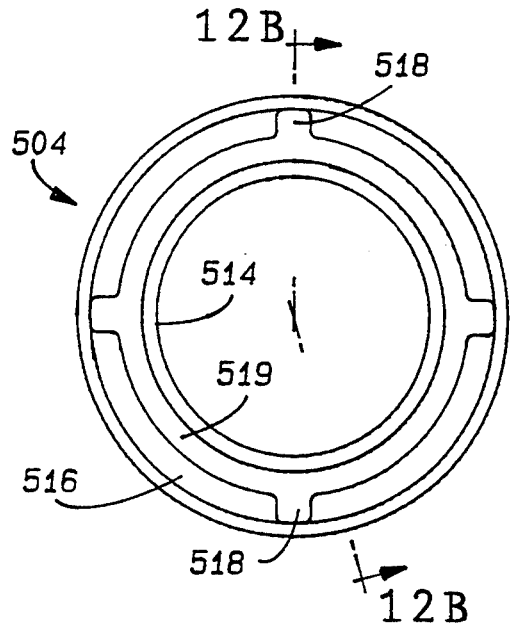
FIG. 12A is an inboard end view of another embodiment of an inboard retainer lock for utilization with the present invention.
Figure 12B:
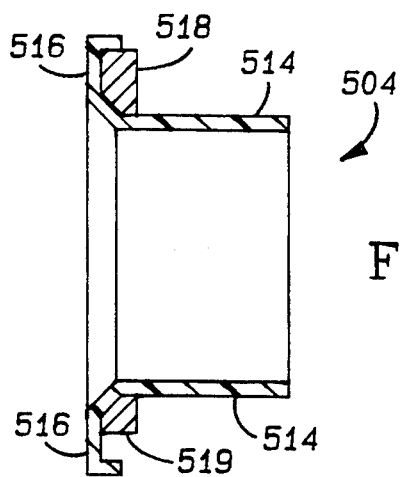
Figure 13:
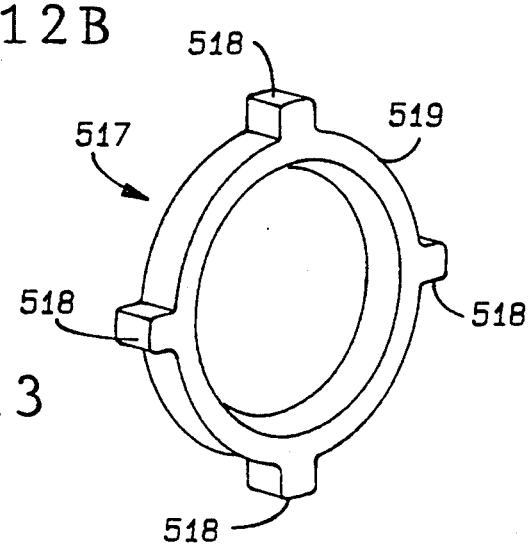
FIG. 13 is a perspective view of the locking ring insert used with the embodiment of FIGS. 12A and 12B.

Another, more robust embodiment of a retainer lock provided by the present invention is generally illustrated in FIGS. 12A, 12B and 13 and designated at 504. Intended to be used with a retainer nut 402 as shown and described in connection with FIG. 9, the retainer lock 504 has a composite construction which also integrates the functions of the shear pin, thrust washer and needle bearings.

With the retainer nut 402 engaged with the threaded portion 410 of the spindle's inboard portion 20 as previously described, the retainer lock 504 engages the retainer nut 402 and the inboard portion 20 of spindle 12 in a press-fit engagement so that its sleeve bearing 514 is seated on the inner diameter of the spindle 12. Axially inboard of the sleeve bearing 512, the retainer lock 504 includes a radial flange 516 whose inboard surface operates as the thrust face of a thrust washer by extending a predetermined distance beyond the inboardmost surface of the retainer nut 402. The radial flange 516 and the sleeve bearing 514 are integrally formed with each other and are preferably constructed from glass filled nylon or an injection molded polymer (additives, such as molybdenum, could also be used). The polymer or mounting portion of the retainer lock 504 is molded so as to encapture a metal, preferably steel, locking ring 517. The locking ring 517 includes an annular portion 519 from which extends an appropriate number of locking tabs 518. The locking tabs 518 extend from the annular portion 519 in a generally axially outboard direction so as be positioned within the slots 72 and 412 of the spindle 12 and retainer nut 402.

Figure 14:
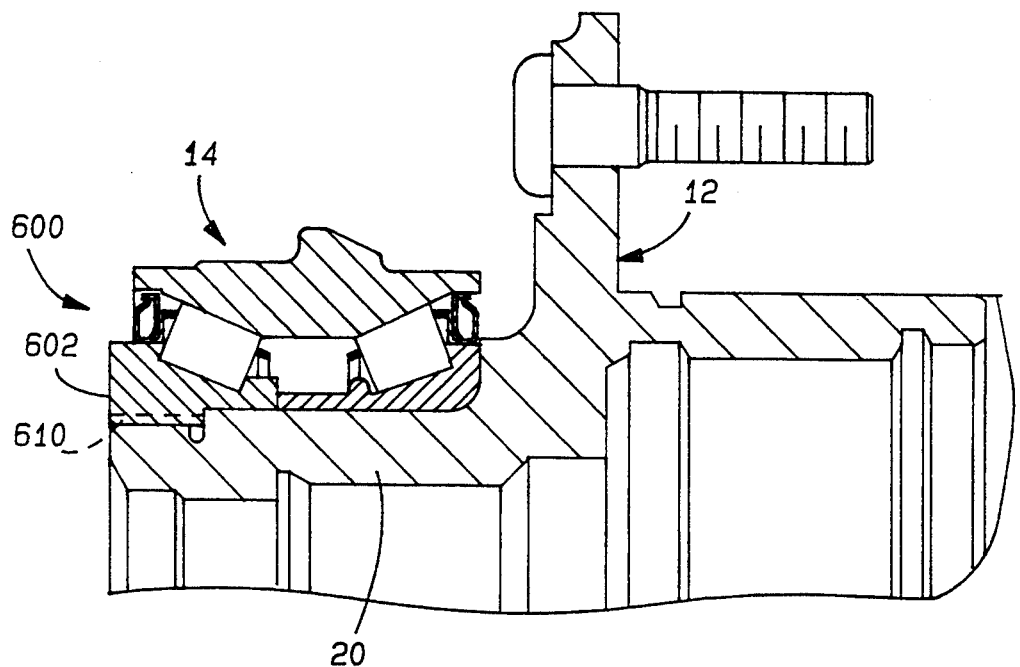
FIG. 14 is a sectional view of another embodiment of the present invention providing for inboard bearing retention.
Figure 15:
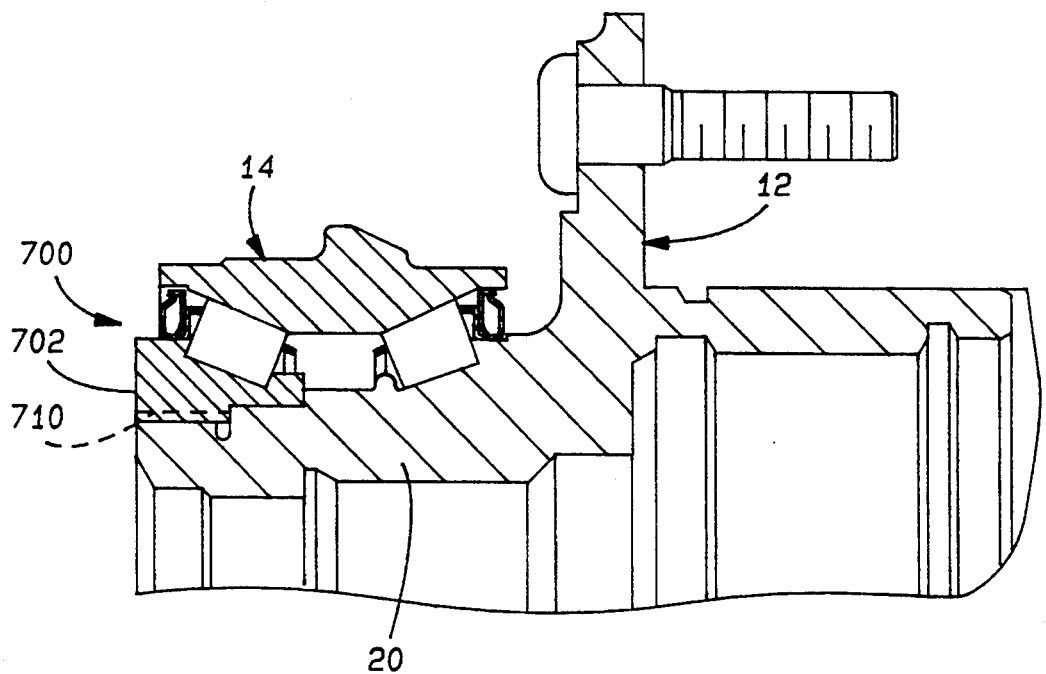
FIG. 15 is a sectional view of still another embodiment of the present invention.

Two additional embodiments of the present invention are presented in FIGS. 14 and 15. As seen in FIG. 14, the bearing retainer assembly 600 includes a retainer nut 602 having a threaded portion 610 on its inner diameter which is threadably engaged on the threaded outer diameter of the spindle's inboard portion 20. In this embodiment, the retainer nut 602 also operates as the inboard race for the bearing assembly 14.

The bearing retainer assembly 600 may also include a retainer lock as described in connection with the prior embodiments or, as illustrated, rotation of the retainer nut 602 and disengagement of the retainer nut 602 can be prevented by upsetting a portion of the interface between the threaded portion 610 of the retainer nut 602 and the threaded portion of the spindle's inboard portion 20.

The embodiment seen in FIG. 14 is similar to that illustrated in FIG. 15. In this embodiment, the bearing retainer assembly 700 includes a bearing retainer nut 702 that operates as the inboard race of the bearing assembly 14. The outer race of the bearing assembly 14 is integrally formed in the inboard portion 20 of the spindle 12. The retainer nut 702 again includes a threaded portion 710 which is threadably engaged with the threaded outer diameter of the spindle's inboard portion 20. Rotation and disengagement of the bearing retainer assembly 700 from the spindle 12 could again be achieved by a retainer lock, as specified in the prior embodiments, or through the upsetting of the threaded interface between the threaded portion 710 of the retainer nut 702 and the threaded outer diameter of the spindle's inboard portion 20.

While the above description constitutes the preferred embodiments of the present invention, it will be appreciated that the invention is susceptible to modification, variation and change without departing from the proper scope and fair meaning of the accompanying claims.

We claim:

1. In a vehicle wheel assembly having a live spindle supported by a wheel bearing for rotation relative to a mounting member, the live spindle having inboard and outboard ends and also having a central bore defined therein through which extends an axle driven for rotation, the vehicle wheel assembly also having a hub lock for coupling the axle to the spindle and transferring rotation therebetween, said improvement comprising:

a bearing retainer adapted to engage the inboard end of the live spindle for rotation therewith, said bearing retainer including portions defining a central aperture through which the axle extends and also including a portion adapted to restrain inboard movement of at least a portion of the wheel bearing relative to the live spindle; and locking means for preventing disengagement of said bearing retainer from the live spindle, said locking means being associated with the inboard end of the live spindle to interfere with and prevent relative movement between said bearing retainer and said live spindle so that inadvertent disengagement thereof will not occur.

2. The improvement as set forth in claim 1 wherein said locking means includes a generally cylindrical portion extending coaxially and being in contact with the central bore of the live spindle.

3. The improvement as set forth in claim 2 wherein said cylindrical portion is a sleeve bearing supporting the axle and being integrally formed with said interfering portion.

4. The improvement as set forth in claim 1 wherein said locking means prevents relative rotation between the live spindle and said bearing retainer and prevents disengagement of said bearing retainer therefrom.

5. The improvement as set forth in claim 1 wherein said locking means includes a tab unitarily formed on a mounting portion which engages the live spindle.

6. The improvement as set forth in claim 5 wherein said tab interferingly engages a slot defined in said bearing retainer and a slot defined in the live spindle.

7. The improvement as set forth in claim 1 wherein said locking means includes at least two tabs, said at least two tabs being located such that one of said tabs is positionable within a slot formed in said bearing retainer and the other of said tabs is positionable within a slot or formed in the inboard end of the live spindle when said slots are in said predetermined positions relative to one another, said tabs interferingly preventing disengagement of said bearing retainer from the live spindle by interferingly preventing relative movement therebetween.

8. The improvement as set forth in claim 1 wherein said bearing retainer is adapted to engage an outer diameter on the inboard end of the live spindle.

9. The improvement as set forth in claim 1 wherein said locking means further includes a mounting portion which engages the inboard end of the spindle and an interfering portion which interferingly engages said retaining nut and the live spindle to prevent relative movement between said retaining nut and the live spindle, said tab being said interfering portion.

10. The improvement as set forth in claim 1 wherein said bearing retainer includes a radially extending flange and an axially extending portion, said flange engaging the wheel bearing and interferingly restraining inboard movement of the wheel bearing relative to the spindle, said axial portion including a surface defining at least a part of a bearing seat for the wheel bearing.

11. In a vehicle wheel assembly including a rotating axle, a locking hub, a mounting member and a wheel bearing engaged with the mounting member, said improvement comprising:

a live spindle including a body having an inboard end and an outboard end, said body being rotatably supported by the wheel bearing in the mounting member, a central bore defined in said body and in which the axle is supported for rotation, said body being connected at said outboard end to the locking hub for coupling to the axle such that said live spindle is driven in rotation by the axle, said body including exterior surfaces generally adjacent to said inboard end defining at least part of a bearing seat for the wheel bearing, said inboard end of said live spindle having portions defining at least one radial slot therein;

a bearing retainer adapted to engage an exterior surface of said inboard end for rotation with said live spindle, said bearing retainer including portions defining a central aperture through which the axle extends and providing a radial portion providing inboard bearing retention so as to restrain inboard movement of the wheel bearing relative to said live spindle, said bearing retainer including portions defining at least one radial slot therein adjacent to said inboard end of said live spindle; and a retainer lock engaged with said inboard end of said live spindle adapted to prevent disengagement of said bearing retainer from said live spindle, said retainer lock including an interfering portion configured to be received in said slot of said bearing retainer and to be received in said slot of said inboard end of said live spindle, said interfering portion preventing disengagement of said bearing retainer from said live spindle by interferingly preventing relative movement therebetween.

12. The improvement as set forth in claim 11 wherein said retainer lock has a one-piece construction and includes said interfering portion, a bearing portion for supporting the axle in said spindle, and a washer portion extending radially from said bearing portion and defining a radial face, said interfering portion including at least one tab configured to be positioned within said slot when said locking means is engaged with said bearing retainer and said live spindle.

13. The improvement as set forth in claim 12 wherein said retainer lock is metal.

14. In a vehicle wheel assembly including a rotating axle and a mounting member for mounting the assembly to a vehicle, said improvement comprising:

a wheel bearing engaged with the mounting member;

a live spindle including a body having an inboard end and an outboard end, said body being rotatably supported by said wheel bearing, a central bore defined in said body and supporting the axle for rotation, said body including exterior surfaces generally adjacent to said inboard end defining at least part of an inner bearing race for the wheel bearing, said inboard end of said live spindle having portions defining at least one generally radially directed slot therein;

a bearing retainer adapted to engage said inboard end of said live spindle, said baring retainer including a radial shoulder located to provide inboard bearing retention thereby restraining inboard movement of the wheel baring relative to said live spindle, said bearing retainer including a portion defining at least part of an inner race for said wheel bearing, said bearing retainer having a slot defined therein adjacent to said inboard end of said live spindle, said slot being alignable with said slot in said live spindle; and retainer lock means for preventing disengagement of said bearing retainer from said live spindle.

15. The improvement as set forth in claim 14 wherein said inner race of said bearing retainer is an inboard race.

16. The improvement as set forth in claim 1 wherein said locking means includes a pin, said pin being positioned within a slot defined in said bearing retainer and interferingly engaging a portion of the live spindle.

17. The improvement as set forth in claim 16 wherein said locking means also includes a generally radial flange, said flange retaining said pin within said slot.

18. The improvement as set forth in claim 1 wherein said bearing retainer is threadably engaged with the live spindle and wherein said locking means is an upset of said threaded engagement between said bearing retainer and the live spindle.

19. The improvement as set forth in claim 12 wherein said retainer lock is plastic.

20. The improvement as set forth in claim 11 wherein said retainer lock has a composite construction and wherein said interfering portion is at least partially encaptured in a mounting portion adapted to mount said retainer lock to the spindle.

21. The improvement as set forth in claim 20 wherein said interfering portion is a metal and said mounting portion is a polymer.

22. The improvement as set forth in claim 20 wherein said interfering portion includes a locking tab configured to be received in said slot of said bearing retainer and in said slot of said live spindle.

23. The improvement as set forth in claim 22 wherein said interfering portion includes an annular ring, said locking tab extending radially from said ring.

24. The improvement as set forth in claim 22 wherein said retainer lock is press-fit into engagement with said live spindle.

* * * * *